(12) United States Patent
Dudek

(10) Patent No.: US 10,173,842 B2
(45) Date of Patent: Jan. 8, 2019

(54) ROLLER WITH INTERNAL ASSEMBLY

(71) Applicant: Interroll Holding AG, Sant' Antonino (CH)

(72) Inventor: Siegmund Dudek, Heinsberg (DE)

(73) Assignee: INTERROLL HOLDING AG, Sant' Antonino (CH)

( * ) Notice: Subject to any disclaimer, the term of this patent is extended or adjusted under 35 U.S.C. 154(b) by 0 days.

(21) Appl. No.: 15/535,729

(22) PCT Filed: Dec. 16, 2015

(86) PCT No.: PCT/EP2015/002538
§ 371 (c)(1),
(2) Date: Jun. 14, 2017

(87) PCT Pub. No.: WO2016/096134
PCT Pub. Date: Jun. 23, 2016

(65) Prior Publication Data
US 2018/0148261 A1 May 31, 2018

(30) Foreign Application Priority Data
Dec. 16, 2014 (DE) .................. 10 2014 018 769

(51) Int. Cl.
*B65G 13/075* (2006.01)
*B65G 23/08* (2006.01)
*B65G 39/09* (2006.01)

(52) U.S. Cl.
CPC .......... *B65G 13/075* (2013.01); *B65G 23/08* (2013.01); *B65G 39/09* (2013.01)

(58) Field of Classification Search
CPC ....... B65G 130/75; B65G 23/08; B65G 39/09
(Continued)

(56) References Cited

U.S. PATENT DOCUMENTS

| 3,899,063 A | 8/1975 | Pollard |
| 6,131,717 A | 10/2000 | Owen |

(Continued)

FOREIGN PATENT DOCUMENTS

| DE | 1 556 577 | 2/1970 |
| DE | 10 2012 003 499 | 8/2013 |

(Continued)

OTHER PUBLICATIONS

International Search Report dated Apr. 11, 2016.
(Continued)

*Primary Examiner* — Mark A Deuble
(74) *Attorney, Agent, or Firm* — Gerald E. Hespos; Michael J. Porco; Matthew T. Hespos

(57) ABSTRACT

A roller (3; 3') has a stationary rod (40) arranged along a longitudinal axis (L) and a tubular roller shell (10) arranged around the rod (40). At least one bearing assembly (20; 20') is arranged on the rod (40) so that the roller shell (10) can rotate about the longitudinal axis (L) of the roller (3; 3'). An internal assembly (30; 30') is on the rod (40) within the roller shell (10) and is coupled to the roller shell (10) via the bearing assembly (20; 20'). Thus, upon rotation of the roller shell (10), an exchange of force occurs between the internal assembly (30; 30') and the roller shell (10). The internal assembly (30; 30') is coupled to the bearing assembly (20; 20') by an end (31) that faces the bearing assembly (20; 20') so that the internal assembly (30; 30') can tilt relative to the bearing assembly (20; 20').

13 Claims, 6 Drawing Sheets

(58) Field of Classification Search
 USPC .................................... 198/788; 193/35 A
 See application file for complete search history.

(56) References Cited

U.S. PATENT DOCUMENTS

| | | | |
|---|---|---|---|
| 6,354,424 B1 | 3/2002 | Rowles | |
| 6,467,601 B2* | 10/2002 | Schmale | B65G 13/075 |
| | | | 193/35 A |
| 7,021,456 B2* | 4/2006 | Haan | B65G 13/075 |
| | | | 193/35 A |
| 9,676,553 B2* | 6/2017 | Wallace | B65G 13/073 |
| 2011/0155539 A1* | 6/2011 | Schmidt | B65G 13/06 |
| | | | 198/608 |
| 2012/0273328 A1* | 11/2012 | Sejourne | B65G 13/075 |
| | | | 198/788 |

FOREIGN PATENT DOCUMENTS

| | | |
|---|---|---|
| FR | 1 351 055 | 1/1964 |
| FR | 1 601 324 | 8/1970 |
| JP | 3-104979 | 9/1978 |
| WO | 84/03685 | 9/1984 |

OTHER PUBLICATIONS

Translation of International Preliminary Report on Patentability for Application No. PCT/EP2015/002538 dated Jun. 20, 2017.
European Office Action dated Jul. 27, 2018.

* cited by examiner

ROLLER WITH INTERNAL ASSEMBLY

BACKGROUND

1. Field of the Invention

The invention relates to a roller having an internal assembly, and to a conveyor system.

2. Description of the Related Art

Conveyor systems regularly have frames on which wheels serving for transporting goods are attached. Here, goods can be transported on the rotating rollers.

In order to influence the transport of goods on the conveyor system, some or all of the rollers may be equipped with a brake and/or a drive in the roller interior. Such an internal assembly arranged in the interior of the roller serves for force transmission to the roller shell of the roller to influence the rotational speed of the roller about its own longitudinal axis.

DE 10 2012 003 499 A1 discloses a roller with an eddy current brake as an internal assembly is known. The eddy current brake arranged in the interior of the roller shell is pressed together with the roller bottom at a longitudinal end of the roller, via which bottom force transmission from the eddy-current brake to the roller shell takes place. The roller has a tubular shield arranged between the eddy current brake and the roller shell, which is to reduce the formation of eddy currents in the roller shell. Therefore, the eddy current brake is coupled to the roller shell only via the roller bottom arranged at the longitudinal end of the rollers.

Different forces act onto the roller, such as a braking force transmitted to the roller shell via the roller bottom by the eddy-current brake, the gravitational force, which particularly in the case of long rollers may result in sagging of a center rod and/or of the roller shell, frictional forces, centrifugal forces depending on the rolling speed, etc. This may lead to wear and tear as well as to material fatigue in such rollers having internal assemblies.

The object underlying the invention is to provide an improved roller having an internal assembly, in particular a roller with greater load-bearing capacity.

SUMMARY

A first aspect relates to a roller comprising a stationary rod arranged along a longitudinal axis of the roller. The roller further includes a tubular roller shell arranged around the rod, and at least one bearing assembly arranged on the rod, via which the roller shell is rotatably supported about the longitudinal axis of the roller. Moreover, the roller includes an internal assembly arranged within the roller shell on the rod and coupled to the roller shell via the bearing assembly such that upon rotation of the roller shell about the longitudinal axis, a force exchange (or force coupling or force transmission) is carried out between the internal assembly and the roller shell. Here, the internal assembly is coupled to the bearing assembly with one end facing the bearing assembly such that the internal assembly can be tilted relative to the bearing assembly.

The stationary rod can be secured in a frame. The stationary rod may have a round or rectangular cross section, in particular a hexahedral cross section, to which both the bearing assembly and the internal assembly can be mounted. Stationary means that the rod itself is configured and provided to be fixed in a rigid manner, non-rotatable about the longitudinal axis, i.e. to be screwed to the frame, for example. To this end, the rod may have corresponding threads. The other stationary components of the roller may in turn be rigidly connected to the rod, for example again by a screw connection.

The roller is formed in a substantially cylindrical shape, wherein the roller shell limits the roller as a cylinder jacket radially outward. Here, the longitudinal axis of the roller coincides substantially with the cylinder axis along which the rod is arranged. The extension direction of the longitudinal axis defines the longitudinal direction. The rod may be arranged substantially horizontally in the frame of a conveyor system, so that goods on the roller shell can be transported perpendicularly to the longitudinal direction on the roller shell.

The roller shell is supported via the at least one bearing assembly such that it can rotate about the longitudinal axis. To this end, the bearing assembly may have a ball bearing, which allows a rotary movement against a very small frictional force. The bearing assembly may in particular be formed as a roller bottom or have a roller bottom, and may be arranged on a longitudinal end of the roller, i.e. on an end of the roller in the extension direction of the longitudinal axis. Preferably, the roller has at least two such bearing assemblies, wherein one bearing assembly is configured and arranged for supporting one respective longitudinal end of the roller shell each.

The internal assembly is configured and provided to influence the rotary movement of the roller shell. Here, a force exchange between the internal assembly and the roller shell takes place. The internal assembly is formed to be at least partially rotatable around the rod. The rotatable part of the internal assembly is configured and provided to co-rotate with the roller shell. In order to enable a force exchange between the roller shell and the internal assembly, i.e. in particular braking and/or driving of the rotary movement of the roller shell, there is a force coupling between the internal assembly and the roller shell. This force coupling takes place via the bearing assembly and allows a force transmission from the roller shell to the two assemblies (bearing assembly and internal assembly) and vice versa.

Both the bearing assembly and the internal assembly are supported on the rod as separate assemblies. In contrast to the roller with eddy current brake as the internal assembly described at the outset, the internal assembly and the bearing assembly of the roller according to the first aspect are formed as respective independent components, which are not firmly bonded. However, the internal assembly and the bearing assembly may be coupled with each other by positive engagement such that a transfer of force from the internal assembly to the roller shell and/or vice versa is enabled. The internal assembly may be tilted relative to the bearing assembly without interrupting and/or weakening the force coupling of the internal assembly to the bearing assembly.

This has the result that the internal assembly, which is secured to the rod, can be tilted relative to the bearing assembly upon bending of the rod. In particular, in the case of long rollers can the rod in the interior of the roller sag more than the roller shell itself, which sags less far than the rod due to its larger diameter at its center.

The bearing assembly serves to support the roller shell and is arranged preferably at a longitudinal end of the roller shell and thus adjacent to the frame. Thus, the orientation of the bearing assembly hardly changes with a bending rod. The internal assembly, which is usually arranged further inside the roller, i.e. in particular closer to the center of the bar than the bearing assembly, is more strongly affected upon bending of the rod. Thus, the orientation of the internal assembly during bending of the rod changes more than the orientation of the bearing assembly. This results in a discrepancy between the orientation of the bearing assembly and the orientation of the internal assembly. Here, the relative orientation of the internal assembly to the bearing assembly may change.

Furthermore, higher loads on the roller, such as the transport of heavy goods, or material fatigue depending on the age of the roller can lead to a change of this relative mutual orientation. The property of the relative tilting capability of the two assemblies (i.e. the bearing assembly and the internal assembly) to each other thus reduces material stress greatly compared to a rigid coupling of the two assemblies or a one-piece configuration of the two assemblies.

The roller according to the first aspect thus provides a roller that is more stable than known rollers and that can adapt to changing loads during operation.

In one embodiment, relative tilting includes a radially outward movement of an end of the internal assembly facing away from the bearing assembly. Radially outward designates an arbitrary direction perpendicularly away from the longitudinal axis. Tilting of the end of the internal assembly facing away from the bearing assembly can be carried out in particular in multiple directions, i.e. in all directions perpendicularly and thus radially pointing away from the longitudinal axis. Relative tilting can take place such that the end of the internal assembly facing toward the bearing assembly hardly moves relative to the bearing assembly, whereas the end of the internal assembly facing away from the bearing assembly moves radially outward. Here, the end of the internal assembly facing away from the bearing assembly moves at least twice, preferably at least three times as far as the end of the internal assembly facing the bearing assembly, which substantially remains immobile relative to the bearing assembly (in the radial direction).

According to one embodiment, the internal assembly is coupled to the bearing assembly via a plug connection. Here, the internal assembly and the bearing assembly constitute first and second assemblies. The first assembly of the two assemblies (i.e. the internal assembly or the bearing assembly) has at least one plug extension, whereas the second assembly of the two assemblies (i.e. the other, either the bearing assembly or the internal assembly) has at least one receptacle for the plug extension. The plug connection between the internal assembly and the bearing assembly can be provided by inserting the plug extension into the receptacle in the extension direction of the longitudinal axis.

For example, the internal assembly may have the at least the one plug extension at the end facing the bearing assembly, whereas the bearing assembly has the at least one receptacle for the plug extension on its side facing the internal assembly. Alternatively, the bearing assembly may have the plug extension and the internal assembly may have the receptacle in the end facing the bearing assembly.

Furthermore, each of the two assemblies may have at least one plug extension and at least one receptacle, so that the two assemblies can be coupled to each other by a plug connection.

Here, the second assembly may have at least as many receptacles as the first assembly has plug extensions.

The first assembly may have at least four plug extension, preferably at least eight plug extensions.

Due to the plug connection in the longitudinal direction, i.e. in the extension direction of the longitudinal axis, the two assemblies are positively coupled to one another upon rotation about the longitudinal axis. This allows a force exchange or force coupling or force transmission between the two assemblies upon rotation of one the two assemblies about the longitudinal axis. This force can be transmitted from the bearing assembly to the roller shell supported thereon, or be received by the roller shell, and be transmitted to the internal assembly via the bearing assembly.

The plug connection may be formed in an unsecured manner, i.e. preferably does not have any latches that would impede slipping-out of the plug extension from the receptacle. This allows the plug extension to partially slip out of the receptacle depending on the bending of the rod and the relative position of the internal assembly to the bearing assembly, without interrupting the positive force coupling upon rotation of one of the two assemblies.

In a further development of this embodiment, the receptacle is formed, i.e. dimensioned, such that the plug extension in the receptacle exhibits a play in the radial direction. Thus, the receptacle is formed to be larger in the radial direction than the plug extension. The play creates a moving space for the plug extension in the radial direction, i.e. in the direction away from the longitudinal axis and/or toward the longitudinal axis. If the internal assembly is tilted relative to the bearing assembly, the at least one plug extension in the receptacle is tilted as well. Due to the play, the plug extension is not loaded any further by elastic or inelastic bending, but it can be tilted without bending, just like the two assemblies.

This play in the radial direction is a particularly favorable way of how relative tilting of the two assemblies with respect to each other can be achieved. In contrast to an alternative or additionally realized elastic deformability of the plug extension, the play has the advantage of reducing elastic loading of the plug extension, which changes upon rotation of the tilting direction.

Here, the play in the radial direction is at least a quarter of a millimeter, preferably a third of a millimeter, particularly preferably half a millimeter, particularly preferably three quarter of a millimeter. This size refers to the play in (positive and/or negative) radial direction of the plug extension inserted into the receptacle. If the first assembly has a plurality of plug extensions insertable into a plurality of receptacles of the second assembly, each of these plug connections has a play that is at least as large as described. Each plug extension inserted into a receptacle has this play as a minimum play both in the direction radially outward and in the direction radially inward. This ensures that the two assemblies can be well tilted relative to each other. The play described is particularly suitable for rollers having an outside diameter of the roller shell of about 50 mm.

Put differently, the play can be at least 0.5% of the outside diameter, preferably at least ⅔ percent of the outside diameter, particularly preferably at least 1% of the outside diameter, particularly preferably at least 1.5% of the outside diameter.

According to one embodiment, at the end facing the bearing assembly, the internal assembly has plug extensions that engage in plug extensions at an end of the bearing assembly facing the internal assembly. Thus, both the internal assembly and the bearing assembly each have plug extensions that engage with another. Here, the bearing assembly may have as many plug extensions as the internal assembly. The plug extensions of the two assemblies can be arranged on facing ends of the two assemblies such that they face away from the respective assembly toward the other assembly. The plug extensions can be arranged around the rod and/or be oriented such that they face away from respective assembly in a direction oriented substantially parallel to the axis of the rod. The plug extensions of the two assemblies can be interlinked with each other and/or into each other directly or indirectly, that is e.g. via an intermediate element. In other words, a plug extension of the bearing assembly can follow a plug extension of the internal assembly and vice versa in the direction around the rod.

In a further development of this embodiment, both the plug extensions of the internal assembly and the plug extensions of the bearing assembly may be arranged in engagement portions of an intermediate element. In this case, the intermediate element is arranged between the internal assembly and the bearing assembly and transmits the rotary movement of the one of the two assemblies to the other of the two modules and vice versa. The intermediate element may substantially be formed as a gear, which between its teeth includes and provides the engagement portions for the plug extensions. The plug extensions of the two assemblies can engage the engagement portions alternately and from the two opposite sides of the intermediate element.

Here, the intermediate element may be formed of an elastomer, may be supported rotatably around the rod, and/or may be supported tiltably relative to the rod. The elastomer can absorb and/or permit tilting of the two assemblies to each other. The elasticity of the intermediate element can allow twisting of the intermediate element, which in turn allows tilting of the intermediate element relative to the rod.

In one embodiment, the internal assembly is formed as an eddy current brake having at least one stationary magnet and an eddy current sensor rotatably supported around the rod, wherein the eddy current sensor and the magnet are radially spaced from each other. Especially with such eddy current brakes is a high-quality and reliable force coupling between the eddy current brake and the roller shell via the bearing assembly necessary to effectively decelerate too strong an acceleration of the rolling movement. The tiltable force coupling of the eddy current brake to the bearing assembly is particularly resistant and therefore durable.

In a further development of this embodiment, a ferromagnetic shielding tube is arranged between the eddy current sensor and the roller shell, which is arranged both radially spaced from the roller shell and radially spaced from the eddy current sensor. The shielding tube is formed to be stationary and serves for shielding of eddy currents that otherwise might cause an unwanted braking action in the roller shell. This provides a particularly simple and gentle rolling start of the roller shell from a rest position.

In this arrangement, a first radial air gap is formed between the magnet, which is stationary and arranged closest to the cylinder axis of the roller on the rod, and the eddy current sensor, a second radial air gap is formed between the eddy current sensor and the radially further outward shielding tube, and finally a third radial air gap is formed between the shielding tube and the roller shell.

These air gaps are formed to be of a small size, but not so small that there would be a risk of contact of the components spaced above the respective air gap. For example by the above described play, such contact can be avoided even under stress, that is e.g. in case of sagging of the rod, when conveying heavy goods on the roller and/or at high rotational speeds with strong centrifugal forces. In order to prevent a contact of the respective components, the relative movement of the individual components to one another may be predetermined, inter alia, by a predetermined freedom of movement of the tilting movement between the bearing assembly and the internal assembly, that is e.g. a predetermined dimensioning of the play.

In a further development of this embodiment, the eddy current sensor is formed to be tubular and is rotatably supported around the rod on at least two points spaced from each other in the extension direction of the longitudinal axis. These two points may be the two longitudinal ends of the eddy current sensor. Especially at the eddy current sensor do high stresses occur during operation due to the braking effect between the magnet and the eddy current sensor on the one hand, and the force coupling of the eddy current sensor via the bearing assembly to the roller shell on the other hand. Therefore, the eddy current sensor is rotatably supported around the rod not only at only one point, but at at least two points, which ensures a particularly secure and good support. The support can be attained via ball bearings or the like.

In one embodiment, the internal assembly has a motor for driving a rotary movement of the roller shell around the rod. In this embodiment, the roller can thus be formed as a driving roller that drives the roller shell, and optionally also an existing conveyor belt via the roller shell.

In one embodiment, the bearing assembly is formed as a roller bottom or comprises a roller bottom, wherein the roller shell is supported on the bearing assembly at one of its longitudinal ends. In particular, the roller may have two bearing assemblies at the longitudinal ends of the roller shell, which are each formed as a roller bottom or have a roller bottom. Supporting the roller shell via roller bottoms fixed at the longitudinal end has the advantage of finishing the roll interior optically and/or mechanically.

A second aspect relates to a conveyor system with a stationary frame, in which a roller according to the first aspect is arranged, wherein the rod of the roller is fixed stationarily to the frame. Here, the conveyor system can in particular be formed as a non-driven conveyor system having a slope and at least one braked roller, which prevents excessive acceleration of the goods on the conveyor line. The internal assembly of the roller provides the braking effect required for this purpose, for example when the internal assembly is formed as a brake, in particular as an eddy current brake.

In the following, the invention will be described in more detail with reference to embodiments illustrated in the figures. Individual features shown in the figures may be combined with features of other embodiments. Same reference numerals in different embodiments may designate same or similar features.

DETAILED DESCRIPTION

Figure 1:
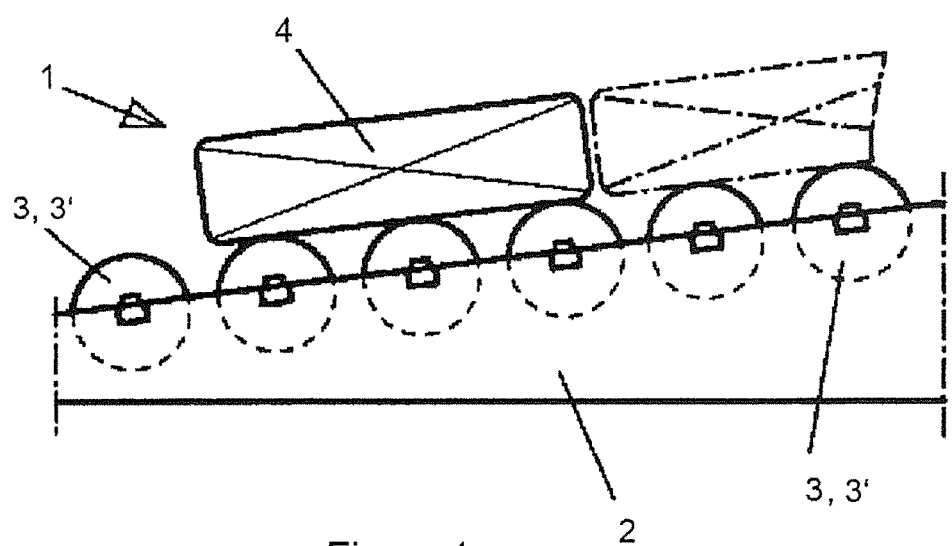
FIG. 1 a schematic side view of a conveyor system.

FIG. 1 shows a side view of a conveyor system 1 formed as a roller conveyor. The conveyor system 1 comprises a frame 2, which is arranged in a stationary way and on which a plurality of rollers 3; 3' is arranged. The roller shells of the plurality of rollers 3; 3' form a conveyor line for an item 4 being conveyed on the conveyor system 1. The rollers 3; 3' may be formed to be free and without their own drive and/or their own brake, and carry the item 4 placed thereon in a supporting way, said item rolling down the conveyor line formed by the rollers 3; 3' due to its weight. One or more of the rollers 3; 3' can be formed as a roller having an internal assembly.

Figure 2:
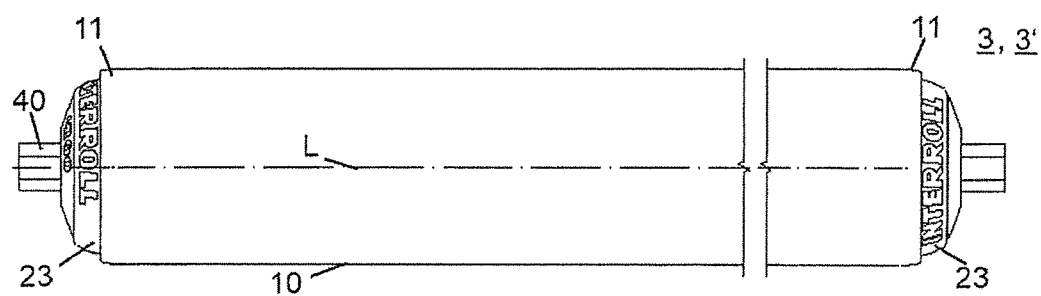
FIG. 2 is a lateral view, a roller according to an embodiment from a radial direction.

FIG. 2 is a side view of a roller 3; 3' from a viewpoint radially spaced from the roller 3; 3'. The roller 3; 3' is substantially cylindrical and extends in the longitudinal direction, i.e. along a longitudinal axis L of the roller 3; 3'. The roller 3; 3' can be fixed to the frame 2 shown in FIG. 1 via a rod 40. The rod 40 is formed along the longitudinal axis L of the roller 3; 3' and coincides with the cylinder axis of the roller 3; 3'.

The roller 3; 3' has a tubular roller shell 10, which is formed as a cylinder jacket of the roller 3; 3' and which delimits the roller 3; 3' in the radial direction. The roller 3; 3' can be fixed in the frame 2 shown in FIG. 1 together with the rod 40 such that the outer side of the roller shell 10 forms a part of the conveyor line for the item 4 to be conveyed. Roller bottoms 23 (as part of a bearing assembly described below) are arranged at the two opposite longitudinal ends of the roller shell 10, one as a cylinder base and one as a cylinder cover of the roller 3; 3'. The roller bottoms 23 close the interior of the roller shell 10 at its longitudinal ends.

Figure 3:
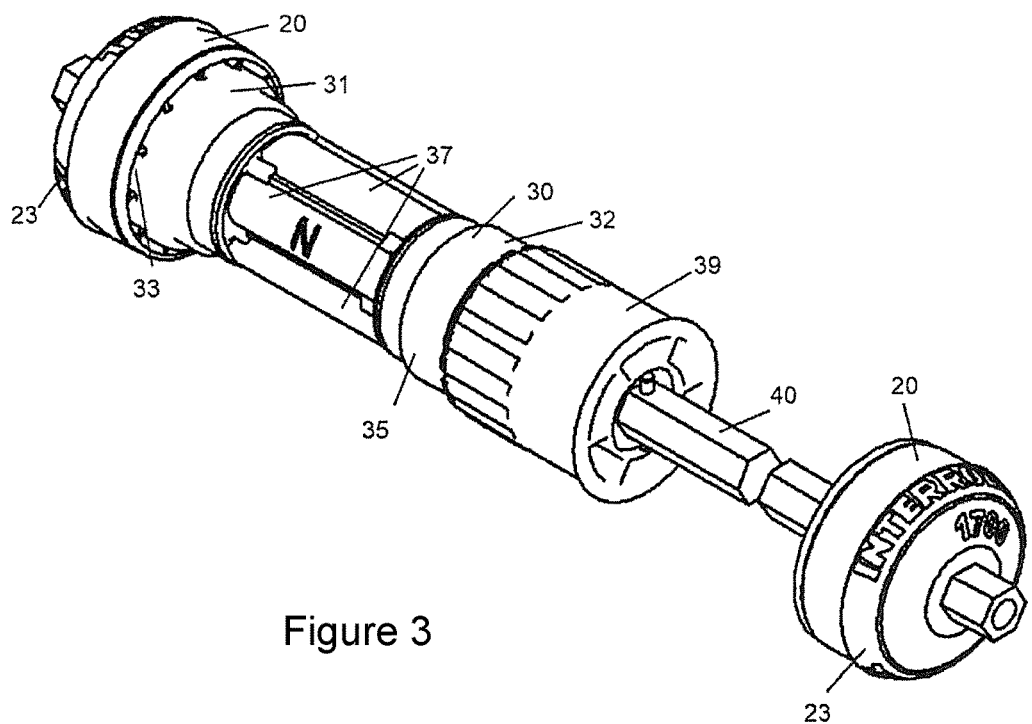
FIG. 3 is a first perspective view, some components in the interior of the roller of FIG. 2.
Figure 4:
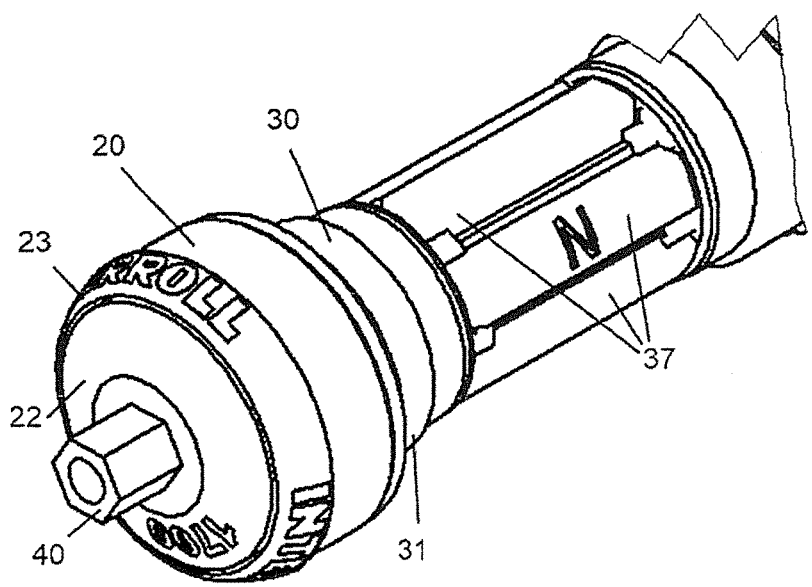
FIG. 4 is a second perspective view, some components in the interior of the roller of FIG. 2.

FIGS. 3 and 4 show first and second (different from the first one) perspective views of some components in the interior of the roller 3. Here, particularly the rod 40 penetrating the roller 3 completely from one longitudinal end to the opposite longitudinal end is shown.

In an alternative embodiment, the rod 40 may be formed with a through hole and thus be formed only partially along the longitudinal axis of the roller 3.

The roller 3 shown in FIGS. 3 and 4 is shown without the roller shell 10 (cf. FIG. 2). Further, the roller shown in FIGS. 3 and 4 is shown without a shielding tube and without an eddy current sensor (cf. FIGS. 6 and 7). At the two longitudinal ends of the roller 3 is arranged a bearing assembly 20, which has a roller bottom 23 closes the roller shell (not shown). In addition to the roller bottom 23, each bearing assembly 20 has a seal 22 supported on the rod 40 via a bearing 24 (see FIG. 7).

Adjacent to one of the bearing components 20, an internal assembly 30 is arranged on the rod 40, which is not completely shown in the FIGS. 3A and 3B, but only partially. In the embodiment illustrated in the figures, the internal assembly 30 is formed as an eddy current brake.

The eddy current brake has a plurality of magnets 37 supported on the rod 40 in a stationary way. Here, a north pole magnet is always adjacent to a south pole magnet, so that a magnetic field is formed between the magnets 37. An eddy current sensor 36 can engage in this magnetic field (cf. FIGS. 6 and 7). The eddy current sensor 36 surrounds the magnets 37 radially outwardly.

An end of the internal assembly 30, the end 31, facing the bearing assembly 20 is arranged adjacent to the bearing assembly 20. This end 31 of the internal assembly 30 has a plurality of plug extensions 33 that engage in receptacles of the bearing assembly 20. The end 31 of the internal assembly 30 facing the bearing assembly 20 is rotatably supported around the rod 40, so that it rotates around the rod 40 exactly when the bearing assembly 20—more precisely—the roller bottom 23 rotates around the rod 40. This happens especially when the roller shell 10 (cf. FIG. 2) rotates around the rod 40, for example driven by an item rolling down the conveyor line.

The internal assembly 30 is coupled to the bearing assembly 20 at the end 31 facing the bearing assembly 20 via a plug connection. At the opposite end, the end 32 of the internal assembly 30 facing away from the bearing assembly 20, the internal assembly 30 is arranged adjacent to a block 39. The block 39 is stationarily connected to the rod 40 and serves as a stationary anchorage for a shielding tube 38 shown in FIGS. 5 and 6.

Figure 5:
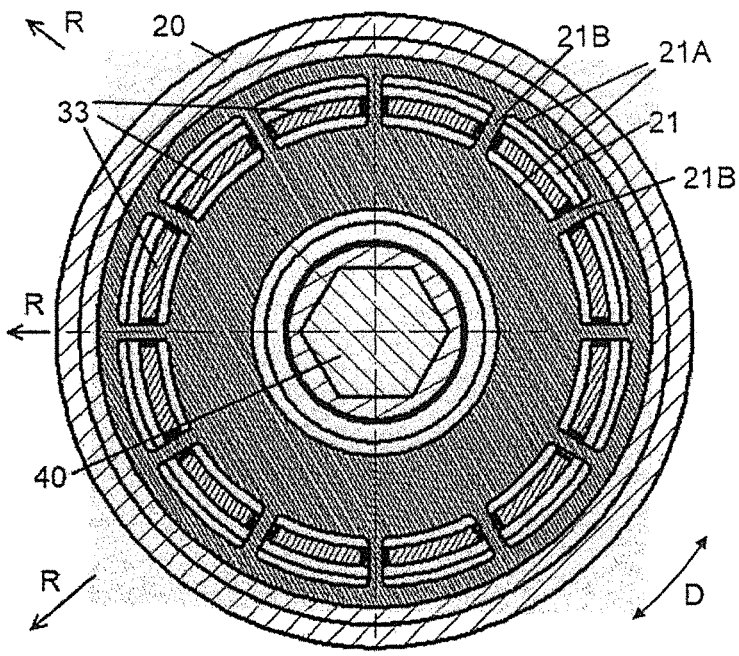
FIG. 5 is cross section through a bearing assembly of the roller of FIG. 2.

FIG. 5 shows a cross section through the tube 3, namely through the bearing assembly 20, which is arranged adjacent to the internal assembly 30. In the middle of FIG. 5, the rod 40 can be seen in cross-section, which is designed angularly, in the embodiment shown in the figures hexahedrally.

The bearing assembly 20 has a plurality of receptacles 21. Each receptacle 21 is limited by two curved webs in the radial direction, and by a respective ray-shaped web in the direction of rotation D. The two curved boundaries are formed as bent abutments 21A, whereas the straight webs are formed as a ray-shaped abutments 21B. The receptacle 21 is formed as a recess and/or depression in the bearing assembly.

One associated plug extension 33 of the internal assembly 30 engages in each receptacle 21.

In the embodiment shown in the figures, the internal assembly 30 has twelve plug extensions 33, which engage in twelve associated receptacles 21 of the bearing assembly 20. Upon rotation of the roller shell 10 in the direction of rotation D, a force acts on the bearing assembly 20, as the roller shell 10 and bearing assembly 20 are positively, non-positively and/or firmly bonded together.

This causes a rotary movement of the bearing assembly 20 around the rod 40. This rotary movement takes place in the direction or rotation D around the rod 40, in the sectional view shown in FIG. 5 for example clockwise and/or counterclockwise. The ray-shaped abutments 21B of the receptacles 21 abut against the plug extensions 33 arranged in the receptacles 21. Therefore, take the receptacles 21 take the plug extensions 33 with them upon rotary movement and thus transmit the force of the rotary movement of the roller shell 10 to the internal assembly 30.

The plug connection between the bearing assembly 20 and the internal assembly 30 may substantially be formed without freedom of movement, that is free of play, in the direction of rotation D, for example by the ray-shaped abutments 21B of the receptacles 21 being fit precisely to the width of the plug extensions 33 (in the direction of rotation D). Here, a clearance fit or transition tolerance can facilitate the mounting process.

Upon rotary movement of the roller shell 10 in the direction of rotation D, a rotary movement of the bearing assembly 20 is driven—as described—, which in turn causes a rotary movement of rotatable components of the internal assembly 30 via the plug connection.

In other words, the internal assembly 30 is positively coupled to the bearing assembly 20 via the plug connection, in particular via the plug extensions 33 and the radial abutments 21B, whereby a force exchange or a transmission of force between the internal assembly 30 via the bearing assembly 20 to the roller shell 10, and vice versa, is made possible.

Further, FIG. 5 shows the radial direction R: The radial direction faces radially away from the rod 40 toward the outside, first in the direction of roller shell and beyond the roller shell to the outside. Thus, the radial direction includes a plurality of directions perpendicular to the longitudinal axis L.

Figure 6:
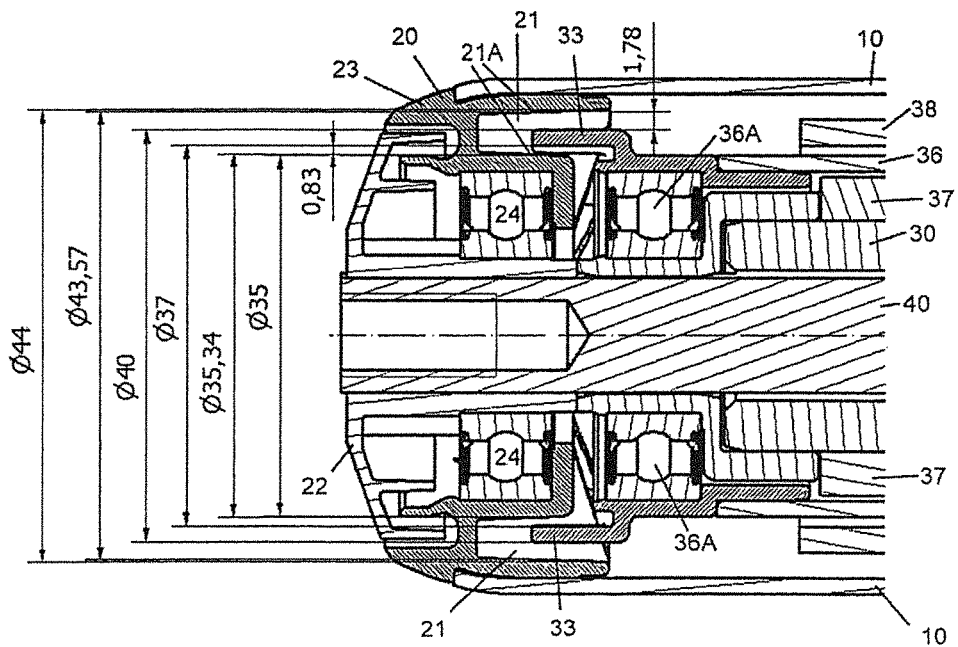
FIG. 6 is a first longitudinal section through the roller of FIG. 2.

FIG. 6 shows a longitudinal section through the roller 3. Clearly shown is the section through the rod 40 arranged on the longitudinal axis L. Furthermore, the block 39 and the magnets 37 of the internal assembly 30 are fixed stationarily to the rod 40. Here, the magnets 37 are arranged in a magnet cartridge 37A of the bearing assembly 30.

Arranged at the two longitudinal ends of the roller 3 is a bearing assembly 20 having a seal 22, a roller bottom 23, and a bearing 24. The roller bottom 23 is arranged around the rod 40 and the seal 22 in the direction of rotation D by means of the bearing 24. With each of its two longitudinal ends, the roller shell 10 rests against one of the two bearing assemblies 2 and is therefore also rotatably supported about the longitudinal axis L.

Arranged around the magnets 37 of the bearing assembly 30 is the tubular-shaped eddy current sensor 36, which is formed of an electrically well-conducting material such as copper or aluminum. The eddy current sensor 36 is rotatably supported around the rod 40 at its two longitudinal ends, namely via two bearings 36A and 36B. The two bearings 36A and 36B are arranged at the two longitudinal ends (here: the ends 31 and 32) of the internal assembly 30 and permit rotation of the eddy current sensor 36 around the rod 40.

Upon rotation of the roller shell 10, a rotary movement of the bearing assembly 20 is caused, since the longitudinal ends of the roller shell 10 are fixedly connected to the roller bottoms 23 of the bearing assembly 20. The bearing assembly 20 passes this rotary movement on to the internal assembly 30 via the plug connection shown in FIG. 4, more precisely to the end 31 of the internal assembly 30 associated with the bearing assembly 20 and the eddy current sensor 36 fixedly connected to the end 31. The eddy current sensor rotates around the rod 40 and in particular around the magnets 37. The eddy current sensor 36 is arranged in the magnetic field of the magnets 37, i.e. in the field lines between the magnets 37. Therefore, upon rotation of the roller shell 10, in the electrically well-conducting eddy current sensor 36, electron movements in the form of vortices (eddy currents) are formed, said vortices counteracting the rotary movement and braking it. Thereby, the movement of the rotatable parts of the internal assembly 30 is inhibited, thus in particular of the eddy current sensor 36 and the plug extensions 33, which thus inhibit the rotary movement of the bearing assembly 20 and of the roller shell 10. Thereby, the rotary movement of the roller shell 10 is braked by the eddy current brake.

Arranged at the stationary block 39 is the tubular, stationary shield 38, which is fixed to the block 39 at one side (that is, at a longitudinal end), for example by pressing. The shield 38 may be formed of a ferromagnetic material and, upon rotation of the roller 3 on the one hand, serves to prevent a braking torque due to a continuous remagnetization of the roller shell 10, and on the other hand, to use the magnetic field emanating from the permanent magnet only for the eddy current brake. From the inside to the outside, thus the eddy current sensor 36 is spaced radially from the magnets 37, the shield 38 is spaced radially from the eddy current sensor 36, and finally the roller shell 10 is spaced radially from the shield 38. Air gaps are formed between these components, said components themselves not touching, particularly upon bending of the rod 40. In particular, there is no electrical contact between said components.

By supporting the eddy current sensor 36 on the two bearings 36A and 36B, a particularly strong and stably supported internal assembly 30 is provided, which can withstand stress well.

In previous models, an eddy current sensor is supported only on one side, which may lead to wear and tear, such as to a mechanical and electrical contact of the eddy current sensor with the magnets or a shield, particularly upon bending of the rod or of the tube and/or by braking loads during operation of the roller. This wear and tear is reduced and/or avoided by the improved mounting of the eddy current sensor 36 via the two bearings 36A and 36B.

Figure 7:
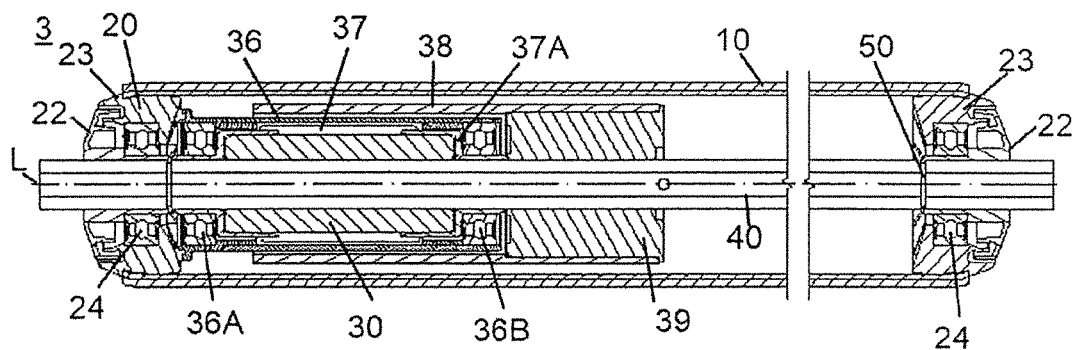
FIG. 7 is a second, offset and enlarged longitudinal section through one end of the roller of FIG. 2.

FIG. 7 shows a longitudinal section through a detail of the roller 3, namely at a longitudinal end of the roller 3. The longitudinal section is in particular through the bearing assembly 20 adjacent the internal assembly 30. In the roller bottom 23 thereof, receptacles 21 are formed to be open in the direction toward the internal assembly 30. That is, the receptacles 21 are aligned with their openings facing in the longitudinal direction and thus parallel to the longitudinal axis L, and face with their openings toward the internal assembly 30 each.

This provides a good engagement possibility for the plug extensions 33 of the internal assembly 30, which are also formed to face in the longitudinal direction and toward the bearing assembly 20 and engage in the receptacle 21.

In an assembled state of the roller 3 (as shown in the figures), there is a plug connection between the bearing assembly 20 and the internal assembly 30. This plug connection provides a positive force coupling between these two assemblies 20 and 30, whereby a rotary movement of one of the two assemblies around the rod 40 is transmitted to the other assembly (cf. FIG. 5).

In the radial direction R, i.e. facing away from the rod 40, each plug extension 33 has a play in the receptacle 21, i.e. freedom of movement in the radial direction. This play is provided by a spacing of each plug extension 33 from each radial boundary of the receptacle 21, thus in particular from the two curved abutments 21A. The play is configured both radially outward and radially inward.

The left part of FIG. 7 exemplarily shows dimensions in millimeters to give a sense of scale of the play of the embodiment shown in the figures. For example, a play in the radial direction radially inwardly is formed to be 0.83 mm, whereas the play radially outward is 1, 78 mm.

This allows a radial movement of the plug extension 33 inside the receptacle 21, in particular tilting of the internal assembly 30 relative to the bearing assembly 20 without deforming components of the roller 3 and without interrupting the positive force coupling or force transmission or force exchange between the roller shell 10 and the internal assembly 30 in the direction of rotation D.

Such relative tilting of the two assemblies 20 and 30 with respect to each other may be caused by bending and/or sagging of the rod 40 in the interior of the roller 3. Since the interior assembly 30 is fixedly supported on and parallel (in the longitudinal direction) to a portion of the rod 40 via the two bearings 36A and 36B, the end 32 of the internal assembly 30 facing away from the bearing assembly 20 moves further downward when the rod 40 bends than the end 31 of the internal assembly 30 facing the bearing assembly 20. Here, the bearing assembly 20 only moves (if at all) downward to the extent the end 31 of the internal assembly 30 facing the bearing assembly 20 does. Since, however, the bearing assembly 20 is arranged adjacent to the stationary fixation of the rod 40 in the frame 2 (cf. FIG. 1), the bearing assembly 20 hardly moves during bending of the rod 40. If at all, the bearing assembly 20 moves only as part of a possible reinforcement of the roller bottom 23 and the seal 22 connected to the rod. In addition, the bearing assembly 20 is fixedly connected to the roller shell 10, which (due to its larger diameter) also bends significantly less than the thinner rod 40. Thus, the two assemblies 20 and 30 tilt relative to each other.

The plug extensions 33 are at first aligned parallel to the walls of the receptacle 21 in the longitudinal direction 21 and are also inserted into the receptacles in the longitudinal direction. Upon bending of the rod 40 and relative tilting of the internal assembly 30 to the bearing assembly 20, the plug extensions 33 come into a position slanted with respect to the walls of the receptacle 21. By the above-described radial play, each plug extension 33 has sufficient freedom of movement for this slanted position, namely this tilting relative to the boundary walls of the receptacle 21. Thereby, a stress on the material not only for the plug extensions 33, but also for the adjoining component of the roller 3 is reduced and/or avoided.

Figure 8:
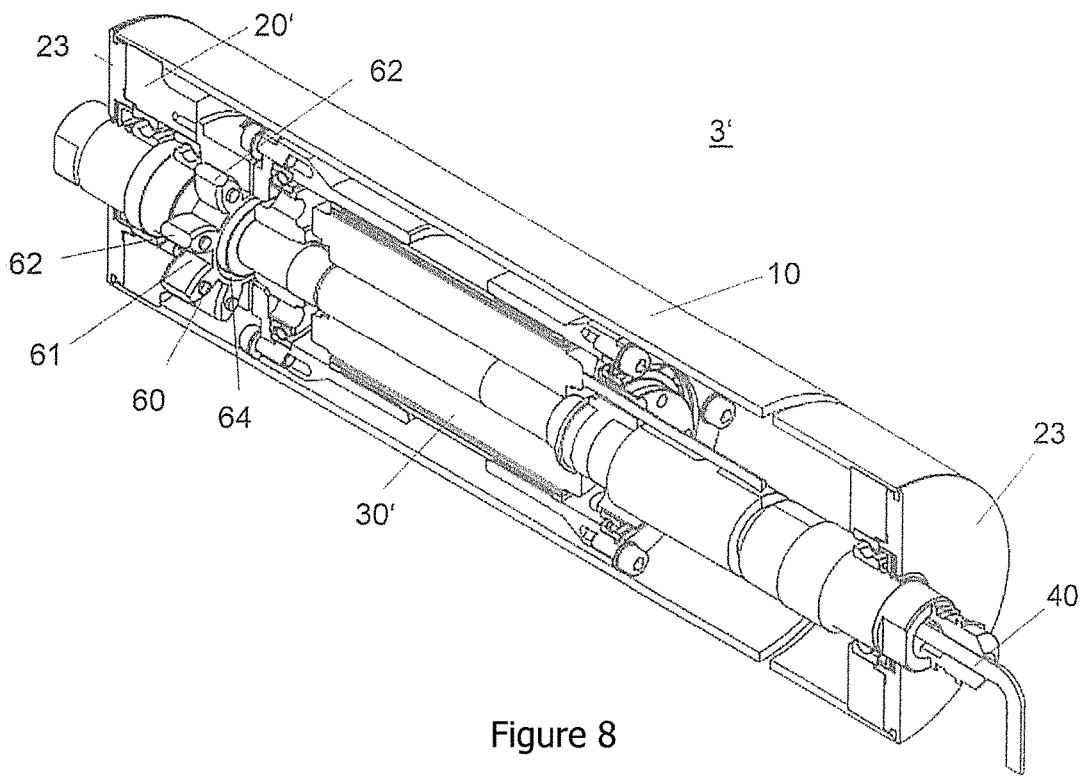
FIG. 8 is a perspective view, a partial cross section of an alternative embodiment.

FIG. 8 shows a perspective view of a partial cross section through a roller 3', which is somewhat different to the roller 3 described above. The roller 3' is similar to the roller 3 described above, which is why the same or similar components of the roller 3' are designated with the same reference numerals as those of the roller 3. For example, the roller 3' also has a roller shell 10, which is rotatably supported about a rod 40.

The roller 3' has an internal assembly 30' arranged in the interior of the roller shell 10 and at least partially rotatably supported around the rod 40. The internal assembly 30' may comprise a motor by means of which a rotary movement of the roller shell 10 around the rod 40 can be driven. Alternatively, the internal assembly 30' may comprise a brake.

A torque of the internal assembly 30' can be transferred to a bearing assembly 20', which is formed on a roller end of the roller 3' and which has a roller bottom 23. The bearing assembly 20' is coupled to the roller shell 10 such that a rotation of the bearing assembly 20' around the rod 40 causes a rotation of the roller shell 10 and vice versa.

The roller 3' has an intermediate element 60 arranged between the bearing assembly 20' and the internal assembly 30'.

The intermediate element 60 is substantially formed as a gear that is rotatably supported around the rod 40. The intermediate element 60 may be formed as a buffer between the two assemblies 20' and 30'. The intermediate element 60 has a plurality of teeth 62, more specifically an even number of teeth 62, which are formed in a radial direction facing away from the rod 40. In the illustrated embodiment, the intermediate element 60 has at least eight teeth 62. Between two respective teeth 62, the intermediate element 60 has an engagement portion 61 each. The intermediate element 60 has the same number of engagement portions 61 as teeth 62, for example an even number of teeth 62 and engagement portions 61.

Figure 9:
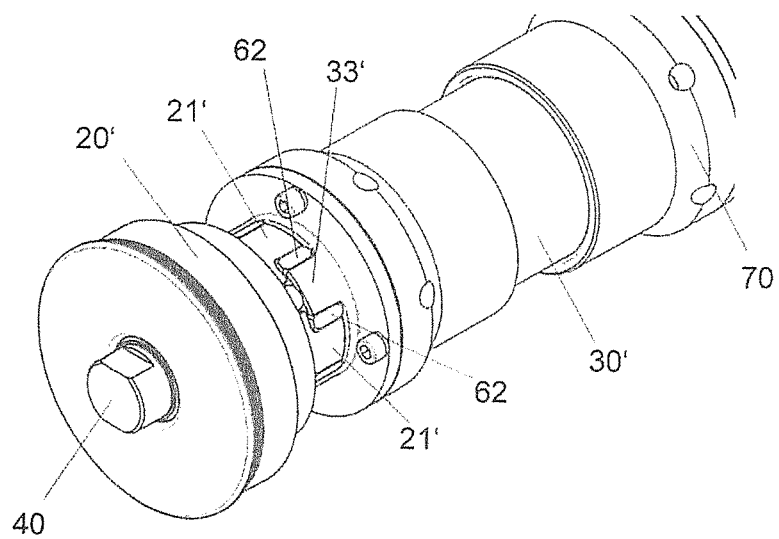
FIG. 9 is a perspective view, a roller end of the embodiment shown in FIG. 8, without the roller shell.

FIG. 9 shows a perspective view of the roller end of the roller 3', on which the bearing assembly 20' is arranged, namely without the roller shell 10. The internal assembly 30' has a motor 70 for driving a rotary movement of the roller shell 10 of FIG. 8 around the rod 40. The internal assembly 30' of FIG. 9 has plug extensions 33' that, aligned in parallel to the rod 40, project from the internal assembly 30' at one end of the internal assembly 30' and face away from the internal assembly 30' toward the bearing assembly 20'. Analogously, the bearing assembly 20' has plug extensions 21' that, aligned in parallel to the rod 40, project from the bearing assembly 20' at one end of the bearing assembly 20' and face away from the bearing assembly 20' toward the internal assembly 30'.

Thus, the plug extensions 33' of the internal assembly 30' face from the center of the roller 3' toward the roller end of the roller 3', at which the bearing assembly 20' is arranged. The plug extensions 33' of the internal assembly 30' engage in some of the engagement portions 61 of the intermediate element 60, in the embodiment shown in every second engagement portion 61.

The plug extensions 21' of the bearing assembly 20' face toward the center of the roller 3' from the roller end of the roller 3', at which the bearing assembly 20' is arranged. The plug extensions 21' of the bearing assembly 20' engage in some of the engagement portions 61 of the intermediate element 60, in the embodiment shown in every second engagement portion 61.

Here, the plug extensions 21' of the bearing assembly 20' engage precisely in those engagement portions 61 of the intermediate element 60 in which the plug extensions 33' of the internal assembly 30' do not engage.

Figure 10:
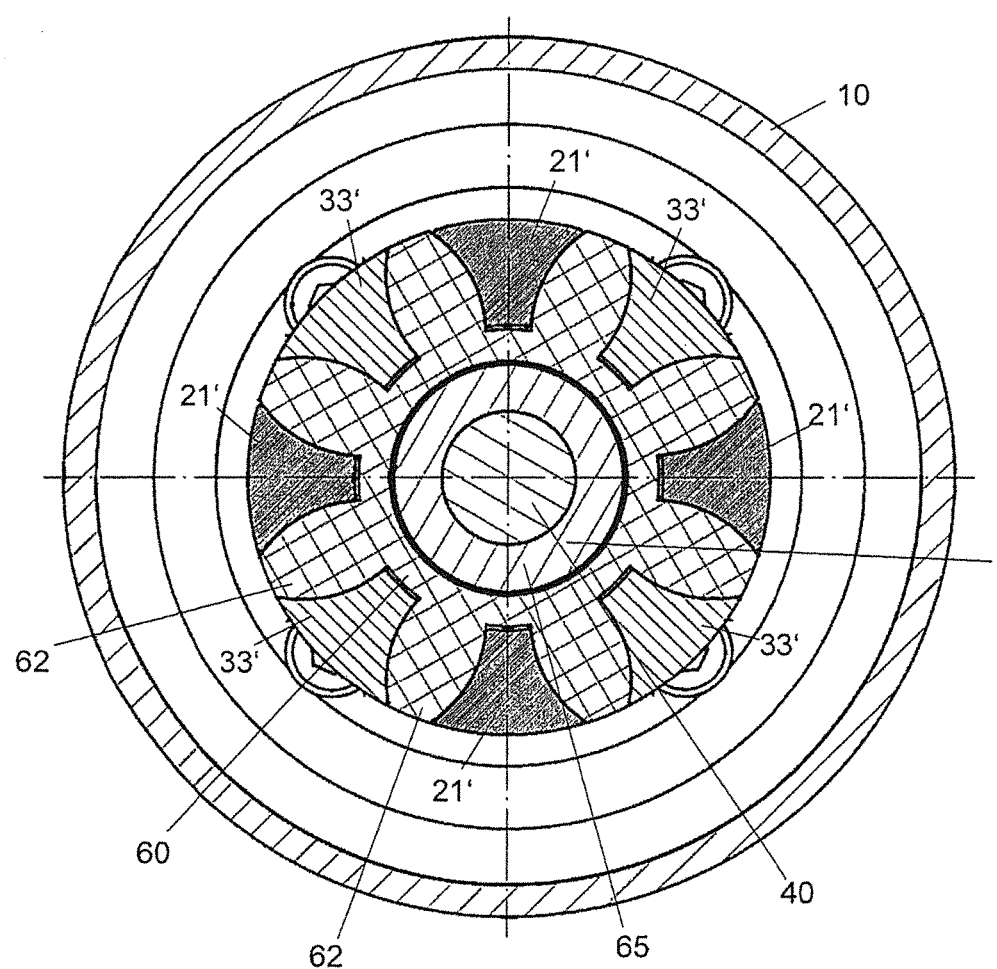
FIG. 10 is a cross section through an intermediate element of the roller of FIGS. 8 and 9.

FIG. 10 shows a cross section through the intermediate element 60 of the roller 3'. Here, either a plug extension 21' of the bearing assembly 20' or a plug extension 33' of the internal assembly 30' alternately engages in the engagement portions of the intermediate element 60. In this case, the plug extensions 21' and 33' of the two assemblies 20' and 30' are each separated from each other by a respective tooth 62.

The cross section in FIG. 10 shows that the cross-sectional shapes of the plug extensions 21' and 33' are adapted to the cross-sectional shapes of the teeth 62 such that the plug extensions 21' and 33' fill the engagement portions 61 substantially completely up to the tooth tips of the teeth 62.

In the illustrated embodiment, the internal assembly 30' has at least four plug extensions 33', and the bearing assembly 20' also has at least four plug extensions 21'. This enables a particularly reliable and mechanically stable interlocking of the two assemblies 20' and 30' for force coupling, and also guarantees a sufficient tiltability of the assemblies 20' and 30' to each other.

The intermediate element 60 may be supported rotatably around the rod 40 via a bearing 65 such that it joins in the rotary movement of the internal assembly 30' and of the bearing assembly 20'.

The intermediate member 60 may be formed of an elastomer, which is formed to be deformable without breaking. To this end, the intermediate element 60 may be formed of a soft plastic 60.

As shown in FIG. 8, the intermediate element 60 may be shaped so that, on an end facing the internal assembly 30', it leaves an air-filled free space 64 between its mounting on the rod 40 (i.e. for example the bearing 65) and the intermediate element 60. The free space 64 is substantially ring-shaped and arranged around the rod 40. Together with the elastic formation of the intermediate element 60, this free space allows and/or enables tilting of the intermediate element 60 relative to the rod 40. Thereby, the interlocked assemblies 20' and 30' can tilt relative to each other, as already described above, for example in connection with of the roller 3 and FIGS. 3 to 7.

The intermediate element 60 may have such a free space 64 also at its end facing the bearing assembly 20', said free space allowing and/or enabling tilting in the opposite direction. That is, the intermediate element 60 may be formed only at its center, through which the cross section shown in FIG. 9 passes, reaching up to the bearing 65 and form the free space 64 respectively at its ends facing the two opposite assemblies 20' and 30'.

LIST OF REFERENCE NUMERALS

D direction of rotation
L longitudinal axis
R radial direction
1 conveyor system
2 frame
3 roller
3' roller
4 item
10 roller shell
11 longitudinal end of the roller shell
20 bearing assembly
20' bearing assembly
21 receptacle
21' plug extension
21A bent abutment
21B ray-shaped abutment
22 seal
23 roller bottom
24 bearing
30 internal assembly
30' internal assembly
31 end of the internal assembly facing the bearing assembly
32 end of the internal assembly facing away from the bearing assembly
33 plug extension
33' plug extension
35 eddy current brake
36 eddy current sensor
36A first eddy current sensor bearing
36B second eddy current sensor bearing
37 magnet
37A magnet cartridge
38 shielding tube
39 block
40 rod
50 half ring
60 intermediate element
61 engagement portion
62 teeth
64 free space
65 bearing

The invention claimed is:

1. A roller (3; 3'), comprising
a stationary rod (40) arranged along a longitudinal axis (L) of the roller (3; 3');
a tubular roller shell (10) arranged around the rod (40);
at least one bearing assembly (20; 20') arranged on the rod (40), via which the roller shell (10) is rotatably supported about the longitudinal axis (L) of the roller (3; 3'), and
an internal assembly (30; 30') arranged within the roller shell (10) on the rod (40) and coupled to the roller shell (10) via the bearing assembly (20; 20') such that upon rotation of the roller shell (10), a force exchange is carried out between the internal assembly (30; 30') and the roller shell (10); wherein:
the internal assembly (30; 30') is coupled to the bearing assembly (20; 20') with an end (31) facing the bearing assembly (20; 20') such that the internal assembly (30; 30') is tiltable relative to the bearing assembly (20; 20'),
the internal assembly (30) is coupled to the bearing assembly (20) via a plug connection,
the internal assembly (30) and the bearing assembly (20) provide a first assembly and a second assembly,
the first assembly has at least one plug extension (33),
the second assembly has at least one receptacle (21) for the plug extension (33),
the plug connection can be provided by inserting the plug extension (33) into the receptacle (21) in the extension direction of the longitudinal axis (L).

2. The roller according to claim 1, wherein relative tilting includes a radially (R) outward movement of an end (32) of the internal assembly (30; 30') facing away from the bearing assembly (20; 20').

3. The roller according to claim 1, wherein the receptacle is dimensioned such that the plug extension (33) in the receptacle (21) exhibits a play in the radial direction (R).

4. The roller according to claim 3, wherein the play in the radial direction (R) is at least ¼ millimeter.

5. The roller according to claim 1, wherein the internal assembly (30; 30') has a motor for driving a rotary movement of the roller shell (10) around the rod (40).

6. The roller according to claim 1, wherein the bearing assembly (20; 20') is formed as a roller bottom (23) or comprises a roller bottom (23), and wherein the roller shell (10) is supported on the bearing assembly (20; 20') with one of its longitudinal ends.

7. A conveyor system (1), comprising a stationary frame (2), in which a roller (3; 3') according to claim 1 is arranged, wherein the rod (40) of the roller (3; 3') is fixed stationarily to the frame (2).

8. A roller (3, 3'), comprising:
a stationary rod (40) arranged along a longitudinal axis (L) of the roller (3; 3');
a tubular roller shell (10) arranged around the rod (40);
at least one bearing assembly (20; 20') arranged on the rod (40), via which the roller shell (10) is rotatably supported about the longitudinal axis (L) of the roller (3; 3'), and
an internal assembly (30; 30') arranged within the roller shell (10) on the rod (40) and coupled to the roller shell (10) via the bearing assembly (20; 20') such that upon rotation of the roller shell (10), a force exchange is carried out between the internal assembly (30; 30') and the roller shell (10), wherein
the internal assembly (30; 30') is coupled to the bearing assembly (20; 20') with an end (31) facing the bearing assembly (20; 20') such that the internal assembly (30; 30') is tiltable relative to the bearing assembly (20; 20'), and
at the end (31) facing the bearing assembly (20'), the internal assembly (30') has plug extensions (33') that engage in plug extensions (21') at an end of the bearing assembly (20) facing the internal assembly (30').

9. The roller according to claim 8, wherein both the plug extensions (33') of the internal assembly (30') and the plug extensions (21') of the bearing assembly (20') are arranged in engagement portions (61) of an intermediate element (60).

10. The roller according to claim 9, wherein the intermediate element (60) is formed of an elastomer, rotatably supported around the rod (40), and/or supported tiltably relative to the rod (40).

11. A roller (3, 3'), comprising
a stationary rod (40) arranged along a longitudinal axis (L) of the roller (3; 3');

a tubular roller shell (10) arranged around the rod (40);

at least one bearing assembly (20; 20') arranged on the rod (40), via which the roller shell (10) is rotatably supported about the longitudinal axis (L) of the roller (3; 3'), and an internal assembly (30; 30') arranged within the roller shell (10) on the rod (40) and coupled to the roller shell (10) via the bearing assembly (20; 20') such that upon rotation of the roller shell (10), a force exchange is carried out between the internal assembly (30; 30') and the roller shell (10), wherein the internal assembly (30; 30') is coupled to the bearing assembly (20; 20') with an end (31) facing the bearing assembly (20; 20') such that the internal assembly (30; 30') is tiltable relative to the bearing assembly (20; 20'), and:

the internal assembly (30; 30') is formed as an eddy current brake having at least one stationary magnet (37) and an eddy current sensor (36) rotatably supported around the rod (40), wherein the eddy current sensor (36) and the magnet (37) are radially spaced from each other.

12. The roller according to claim 11, wherein a ferromagnetic shielding tube (38) is arranged between the eddy current sensor (36) and the roller shell (10), which is arranged both radially spaced from the roller shell (10) and radially spaced from the eddy current sensor (36).

13. The roller according to claim 11, wherein the eddy current sensor (36) is formed to be tubular and is rotatably supported around the rod (40) on at least two points spaced from each other in the extension direction of the longitudinal axis (L).

* * * * *